United States Patent [19]

Tague

[11] Patent Number: 5,283,876
[45] Date of Patent: Feb. 1, 1994

[54] VIRTUAL MEMORY UNIT UTILIZING SET ASSOCIATIVE MEMORY STRUCTURE AND STATE MACHINE CONTROL SEQUENCING WITH SELECTIVE RETRY

[75] Inventor: Steven A. Tague, Tyngsboro, Mass.

[73] Assignee: Bull HN Information Systems Inc., Billerica, Mass.

[21] Appl. No.: 593,825

[22] Filed: Oct. 5, 1990

[51] Int. Cl.$^5$ .................. G06F 12/08; G06F 12/02
[52] U.S. Cl. ................................. 395/400; 395/425
[58] Field of Search ... 364/200 MS File, 900 MS File; 395/400, 425

[56] References Cited

U.S. PATENT DOCUMENTS

| | | | |
|---|---|---|---|
| 4,068,304 | 1/1978 | Beausoleil et al. | 395/500 |
| 4,332,010 | 5/1982 | Messina et al. | 395/425 |
| 4,456,954 | 6/1984 | Bullions, III et al. | 395/400 |
| 4,464,712 | 8/1984 | Fletcher | 395/425 |
| 4,538,241 | 8/1985 | Levin et al. | 395/400 |
| 4,695,950 | 9/1987 | Brandt et al. | 395/400 |
| 4,785,398 | 11/1988 | Joyce et al. | 395/425 |
| 4,811,215 | 3/1989 | Smith | 395/375 |
| 5,091,846 | 2/1992 | Sachs et al. | 395/250 |
| 5,133,061 | 7/1992 | Melton et al. | 395/425 |

Primary Examiner—Joseph L. Dixon
Assistant Examiner—Matthew M. Kim
Attorney, Agent, or Firm—Faith F. Driscoll; John S. Solakian

[57] ABSTRACT

A virtual memory unit has a plurality of directory and buffer store levels for storing page descriptor information. The memory directories and a least recently used (LRU) device constructed from the same type of standard cache address directory part include parity error detection circuits. The virtual memory unit further includes a state machine for defining sequential states used in generating control signals for directing the memory unit's operation in translating virtual addresses into physical addresses. Programmable control circuits which generate the required input data and control signals applied to the directories and LRU device for reading and updating their contents further include the retry facilities which, in response to certain types of error situations, alter state machine sequencing to again try the virtual to physical address translation with a fresh copy and the LRU replacement operations in a way to improve robustness.

10 Claims, 6 Drawing Sheets

VIRTUAL MEMORY UNIT UTILIZING SET ASSOCIATIVE MEMORY STRUCTURE AND STATE MACHINE CONTROL SEQUENCING WITH SELECTIVE RETRY

RELATED PATENT APPLICATIONS AND PATENTS

1. The patent application of Richard A. Lemay, Steven A. Tague and William E. Woods entitled, "A Virtual Memory State Machine," filed on Oct. 5, 1990, bearing Ser. No. 07/593,903, which is assigned to the same assignee as this patent application.
2. The patent application of George J. Barlow, James W. Keeley, Richard A. Lemay, Jian-Kuo Shen, Robert V. Ledoux, Thomas F. Joyce, Richard P. Kelly and Robert C. Miller entitled, "Recovery Method and Apparatus for a Pipelined Processing Unit of a Multiprocessor System," filed on Oct. 5, 1990, bearing Ser. No. 07/593,498, which is assigned to the same assignee as this patent application.
3. The patent application of Forrest M. Phillips entitled, "Least Recently Used Replacement Level Generating Apparatus," filed on Sep. 1, 1989, bearing Ser. No. 07/402,192, issued as U.S. Pat. No. 5,125,085 on Jun. 23, 1992 and which is assigned to the same assignee as this patent application.
4. The patent application of Robert V. Ledoux, Richard P. Kelly and Forrest M. Phillips entitled, "Ring Reduction Logic Mechanism," filed on Mar, 31, 1989, bearing Ser. No. 07/332,258, issued as U.S. Pat. No. 5,117,491 on May 26, 1992 and which is assigned to the same assignee as this application.
5. The patent application of Forrest M. Phillips, Thomas F. Joyce and Ming-Tzer Miu entitled, "Apparatus and Method for Address Translation of Non-Aligned Double Word Virtual Addresses," filed on Jan. 5, 1989, bearing Ser. No. 07/294,528, issued as U.S. Pat. No. 5,051,894 on Sep. 24, 1991 and which is assigned to the same assignee as this application.

BACKGROUND OF THE INVENTION

1. Field of Use

The present invention relates to data processing systems and, in particular, to cache memory systems.

2. Prior Art

It is known to provide parity check circuits for detecting errors in the addresses and information read from the directory or cache store during a read cycle of operation to generate signals which simulate a condition that the requested information was not stored in cache store although it was stored and read out. This causes a backing store cycle of operation to be initiated for read out of a correct version of the actual requested information from a backing store containing error detection and correction (EDAC) circuits. This system is disclosed in U.S. Pat. No. 4,084,236 which issued on Apr. 11, 1978.

While the above system improves the reliability of the information being provided, it presumes that the states of the cache address directory circuits are faulty. In other words, it is not very fault tolerant.

Faults are generally classified in terms of their duration, nature and extent. The duration of a fault can be transient, intermittent or permanent. A transient fault, often the result of external disturbances, exists for a finite length of time and is nonrecurring. Thus, the ability to retry or recover from such transient faults becomes important for a system to be fault tolerant.

This is particularly important in cases where the cache unit is utilized as part of a virtual memory unit, responsible for translating virtual addresses into physical addresses. Accordingly, it is a primary object of the present invention to provide a virtual memory unit which is more resilient to various types of error conditions.

It is a further, more specific object of the present invention to provide a virtual memory unit which incorporates resiliency features without increasing the complexity of the unit.

SUMMARY OF THE INVENTION

The above and other objects of the present invention are achieved in a preferred embodiment of a virtual memory unit (VMU). The VMU includes a plurality of directory and buffer store levels for storing quadrant, segment and page descriptor information. The memory directories which store page descriptor information and an associated least recently used (LRU) device are constructed from the same type of standard cache parts which include parity error detection circuits. These circuits operate to detect errors in the directory addresses being accessed. The VMU further includes a state machine for defining sequential states in generating control signals for directing the VMU in translating virtual addresses into physical addresses. The state machine is implemented as disclosed in the referenced related copending patent application entitled, "A Virtual Memory State Machine."

Programmable control circuits which generate the required input data and control signals applied to the directories and LRU device for reading and updating their contents further include retry facilities. The control circuits, in response to certain types of parity error conditions, alter state machine sequencing and mode of operation to again attempt a virtual address translation with a fresh copy of the descriptor fetched from memory and alter the LRU device replacement operation in a way which improves the VMU's robustness.

For example, when the VMU detects a hit condition on one level and a parity error is detected on the other level, no retry is initiated. Also, the LRU device is permitted to carry out replacement in a normal manner, since the level which reported the problem becomes the next candidate for replacement.

Another situation or mode is when neither level reports a hit indicating that the descriptor is missing and one of the levels detects a parity error. The control circuits, instead of replacing an arbitrary location depending on the state of the LRU device (the previous LRU information), the VMU substitutes its knowledge of which level had the parity error and causes the LRU device to make that error reporting level the one which is least recently used and the next candidate for replacement.

The present invention operates in a different fashion in the situation where multiple levels (i.e., two in the preferred embodiment), report parity errors. The VMU selects one of the levels for immediate replacement and the other level during a later translation attempt.

Finally, the case of a double hit is treated as if both levels had signalled misses. The control circuits cause one level to be invalidated, while the other level is replaced with a fresh copy of the descriptor obtained from memory in the manner previously described.

The above different modes of operation enable the VMU to establish different categories of error situations which are responded to so as to eliminate the effects of transient faults. In the situations where a second error is detected during the execution of a command, this is detected and reported as an unusual event (UEV) condition indicative of a persistent error.

The novel features which are believed to be characteristic of the invention both as to its organization and method of operation, together with further objects and advantages, will be better understood from the description in the following section when considered in connection with the accompanying drawings described in this section. It is to be expressly understood, however, that each of the drawings is given for the purpose of illustration only and is not intended as a definition of the limits of the present invention.

DETAILED DESCRIPTION OF THE PREFERRED EMBODIMENT

VMU40

Figure 1A:
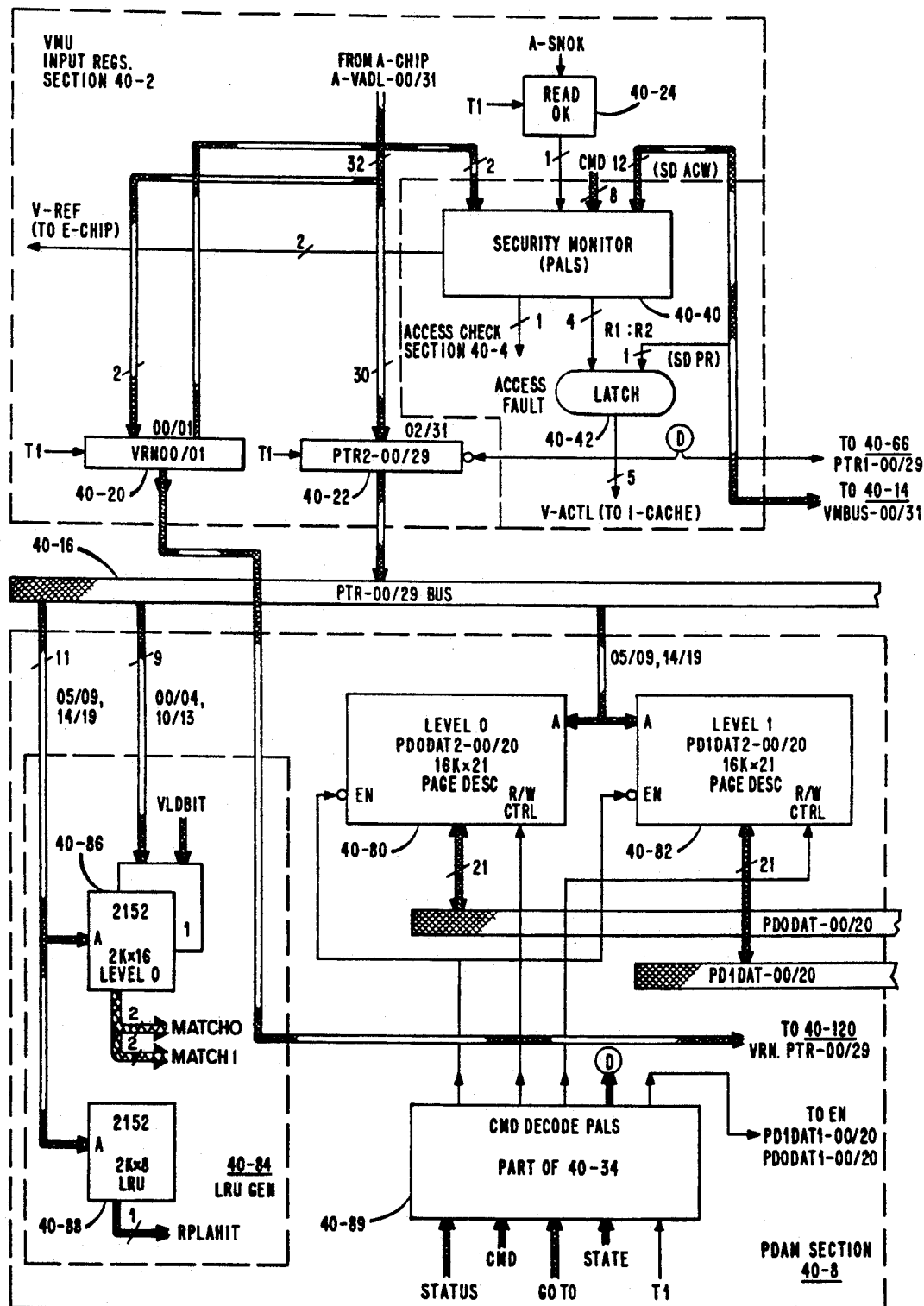
FIGS. 1a through 1c illustrate in block diagram form, a virtual memory unit (VMU) which incorporates the present invention.
Figure 1B:
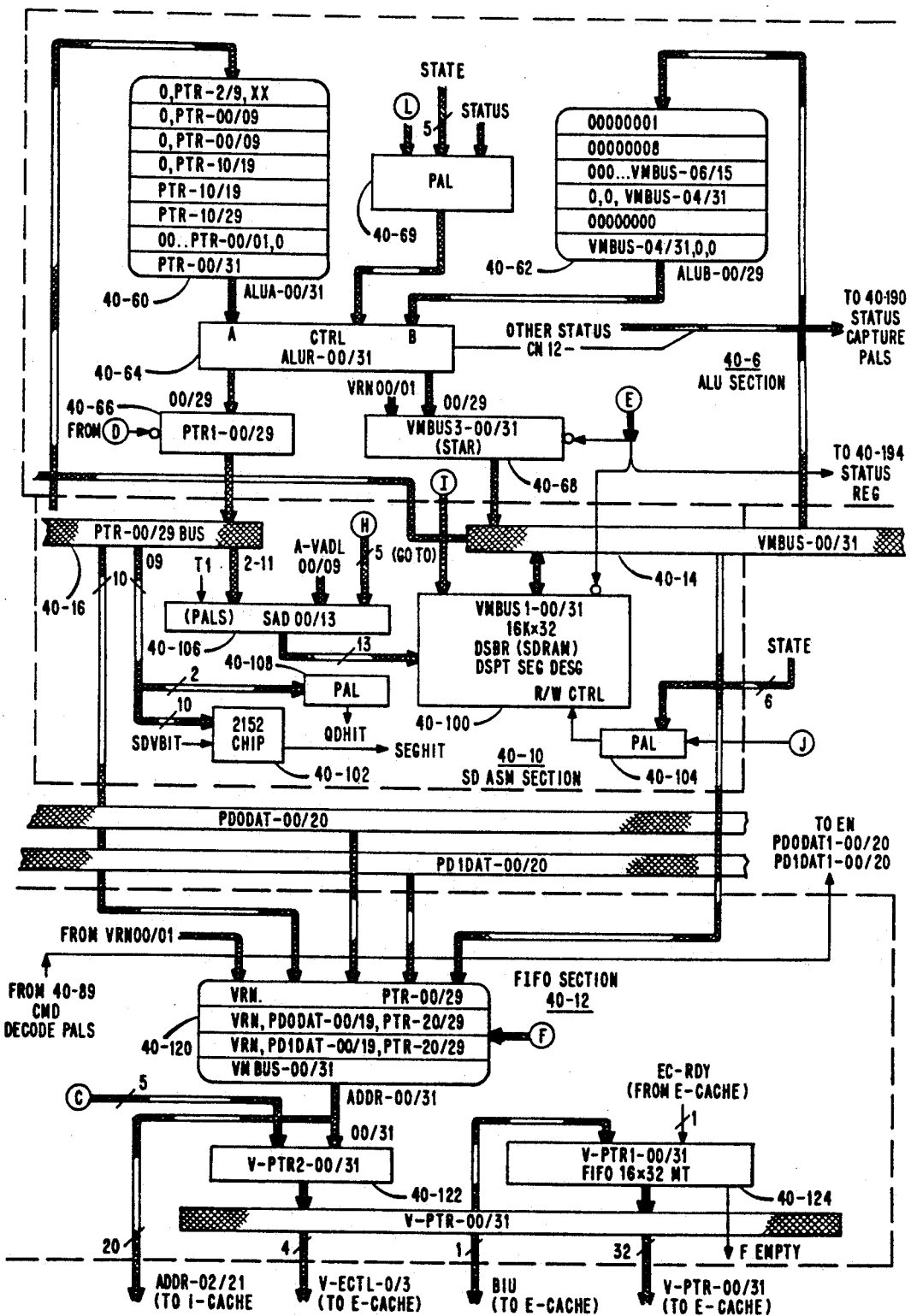
Figure 1C:
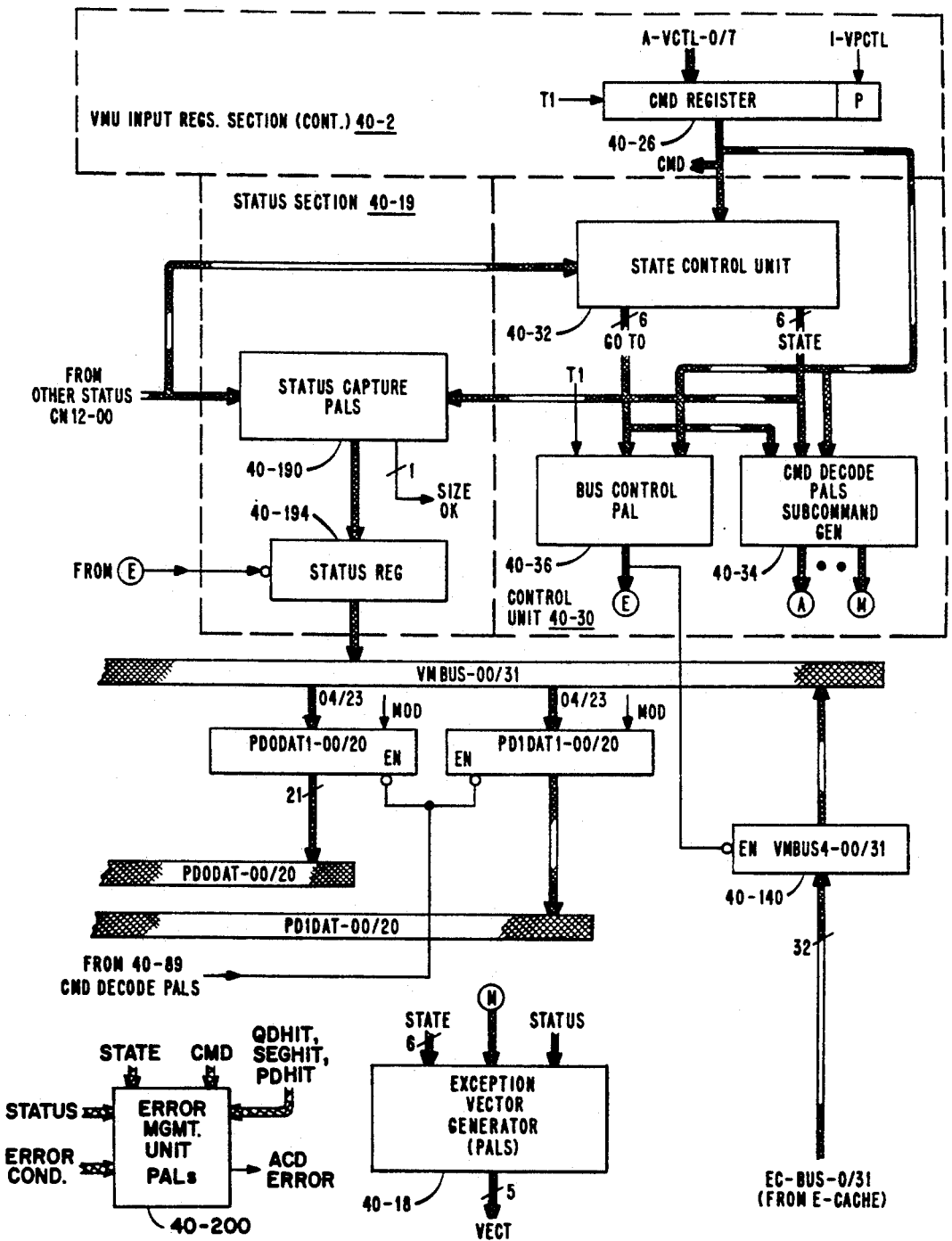

The VMU 40 translates virtual addresses received from one of the main units (A-unit) of a central processing unit (CPU) of a system into physical addresses for fetching instructions from an I-cache unit and operands from an E-cache unit. For further information regarding this system, reference may be made to the referenced related patent applications. FIGS. 1a through 1c are block diagrams of the virtual memory unit (VMU) 40 which incorporates the present invention. As seen from FIGS. 1a through 1c, VMU 40 includes a number of different functional areas or sections. The sections include an input register section 40-2, an access check section 40-4, an ALU section 40-6, a page descriptor (PD) associator section 40-8, a segment descriptor (SD) section 40-10, a FIFO section 40-12 and an error management unit 40-200. Additionally, VMU40 has a VMBUS section 40-14, a pointer (PTR) bus section 40-16, an exception vector generator section 40-18, a status section 40-19 and a control logic section 40-30.

Input Register Section 40-2

The input register section 40-2 includes the virtual address (VAR) input clocked registers which store or capture the input address, control and command signals applied by the A-unit 20-4 at the beginning of each cycle. These registers include a 2-bit position ring number (RN) register 40-20, a 30-bit position virtual pointer register 40-22, a 4-bit position control register 40-24 and a 9-bit position (includes parity) command register 40-26. Address and command parity are checked at the beginning of each command sequence.

The ring number contents of register 40-20 are applied as an input to access check section 40-4, FIFO section 40-12 and control logic section 40-30. The current pointer contents of virtual pointer register 40-22 are applied as an input to ALU section 40-6, PD associator section 40-8, SD section 40-10 and FIFO section 40-12 via PTR bus section 40-16. The contents of control register 40-24 and command register 40-26 are applied as inputs to control logic section 40-30. Also, the contents of register 40-24 are also applied as an input to access check section 40-4.

Access Check Section 40-4

The access check section 40-4 performs the various access and security monitoring functions. These include read and write access checks when required, access checking for read-modify-write (RMW) operations, ring bracket checks for E-cache address pointers and gate bracket security checks for call instructions. The type of access check performed is specified by the control code passed to VMU40 by the A-unit with the virtual address pointer. For operand access checking, the read (R) and write (W) permission bits with the segment descriptor access check word (SD ACW) may be checked, the ring brackets R1, R2 may be checked and traps (access fault) may be issued.

As shown in FIG. 1a, section 40-4 includes a security monitor block 40-40 and a 5-bit position latch 40-42. The security monitor block 40-40 includes a PAL device which receives the ring number signals (VRN0-1), control signal READOK derived from A-unit signal A-SNOK indicating the virtual address pointer is within the range of the current procedure segment, and segment descriptor access check word (SD ACW) signals from SDASM section 40-10 via VMBUS section 40-14.

The security monitor PAL generates as outputs, effective ring number signals V-REF, effective ring bracket signals R1 and R2, and an access fault signal (ALARM). The effective ring bracket signals R1 and R2 are applied as inputs to latch 40-42, along with the privileged (PR) bit obtained from the SD ACW word. The R1 and R2 ring bracket signals and the PR bit are passed along to I-cache 60-2 together with the page frame number (PFN). The PFN is obtained from the page descriptor for the associated virtual address pointer if paged or generated by VMU40 if unpaged. The access fault signal (ALARM) is one of the status signals which is applied as an input to the control logic section 40-30.

ALU Section 40-6

The ALU section 40-6 performs the required arithmetic operations for carrying out address development and boundary/size checking functions. As shown, section 40-6 includes an A input multiplexer 40-60, a B input multiplexer 40-62 and an adder 40-64. The section 40-6 further includes a pair of output registers corresponding to a PTR1 register 40-66 and a STAR register 40-68 arranged as shown. The PTR1 register 40-66 connects to the PTR bus 40-16 while the STAR register 40-68 connects to VMBUS 40-14.

The adder 40-64 is controlled by a PAL device 40-69 which receives signals from control logic section 40-30 as described in greater detail herein. The adder 40-64 generates a carry out signal CN12 for indicating an overflow condition at a 1024 word boundary. This signal is applied as an input to one of a group of PAL devices of status section 40-19 which results in the generation of a signal SIZEOK. The SIZEOK signal is applied as another one of status signals to control logic section 40-30 along with signal CN12. The multiplexers 40-60 and 40-62 provide 32-bit operand signals as inputs to adder 40-64 from the PTR bus 40-16 and VMBUS 40-14 for extracting and scaling the various fields required by the virtual to physical address translation procedures or rules. Additionally, multiplexer 40-62 provides as B operand inputs, constants having the values 0, 1 and 8 as indicated.

Page Descriptor Associator Section 40-8

PDASM section 40-8 includes a two-level set associative cache memory which is used to store and retrieve 20-bit page descriptors used by the virtual memory system. These descriptors, which are stored in level 0 and level 1 memory chips 40-80 and 40-82, are replaced on a least recently used basis by signals generated by least recently used (LRU) generator 40-84. Along with each 20-bit descriptor, a modified (M) bit is stored. The M bit outputs from chips 40-80 and 40-82 are applied as status input signals to control logic section 40-30. The LRU generator 40-84 includes address comparator chips 40-86 and an LRU chip 40-88. The chips 40-86 generate hit signals MATCH-0A, 0B, 1A AND 1B for indicating whether either level contains the page descriptor corresponding to the virtual address being translated. LRU chip 40-88 is used to store replacement information for ensuring that the least recently used information is replaced. For further details regarding the operation of LRU 40-84, reference may be made to the related patent application of Forrest M. Phillips entitled, "Least Recently Used Replacement Level Generating Apparatus."

As shown, the cache memory level 0 and 1 chips 40-80 and 40-82 connect to a pair of data buses PD0DAT and PD1DAT which receive data from a pair of input data registers PD0DAT2 and PD1DAT2, respectively. The PD0DAT2 and PD1DAT2 registers connect as inputs to the VMBUS section 40-14, as shown.

Section 40-8 includes a plurality of PAL devices 40-89 which generate chip enable and read/write control signals for cache memory chips 40-80 and 40-82, in addition to a pair of mutually exclusive register enable signals D for registers 40-22 and 40-66, as shown. The PAL devices 40-89 receive control signals from control logic section 40-30 as described in greater detail herein.

SDASM Section 40-10

The section 40-10 stores the segment descriptors (SEG DESC) and quadrant descriptors (DSPT) and a descriptor segment base register (DSBR) in a RAM 40-100. A segment descriptor RAM 40-100 which can be viewed as a single level cache has sufficient capacity for storing all of the required number of segment descriptors. More specifically, SDRAM 40-100 includes locations for storing descriptor segment page table pointers (DSPT), also known as quadrant descriptors, and a descriptor segment base register (DSBR) value used for generating addresses for referencing main memory to fetch required quadrant and segment descriptors in response to a miss condition. The SDRAM 40-100 also includes circuits for detecting a quadrant descriptor hit (QDHIT). A PAL device 40-104, in response to signals from control logic section 40-30, applies read/write control signals to SDRAM 40-100.

Section 40-10 also includes a comparator chip 40-102 which is connected to receive segment number signals from PTRBUS 40-16 and a segment valid bit signal SDVBIT from VMBUS 40-14. Comparator chip 40-102 generates a segment descriptor hit signal SGHIT for indicating the presence of the segment descriptor in SDRAM 40-100. A PAL device 40-108 generates a quadrant descriptor hit signal QDHIT, as shown.

The SGHIT and QDHIT signals are also applied as status inputs to control logic section 40-30. Section 40-10 also includes a segment address SAD register 40-106 which is constructed from PAL devices. The register 40-106 can be clocked early in a cycle with address signals from either PTR bus 40-16 or A-unit, in response to GOTO signals received from control logic section 40-30, as discussed later herein.

FIFO Section 40-12

Section 40-12 provides the E-cache with signals from one of four sources as directed by control signals F from control logic section 40-30. As shown, section 40-12 includes a 4-way multiplexer 40-120, 32-bit output latch 40-122 which connects to a V-PTR interface bus and a 16×37 bit FIFO buffer circuit 40-124 for storing information received from latches 40-122 when the E-cache signals that it is busy as indicated by the state of E-cache ready signal EC-RDY.

Multiplexer 40-120 has as inputs, the current input pointer and ring number from register 40-20 and PTRBUS 40-16, the output of PDASM level 0 RAM 40-80 and the least significant ten bits of the current pointer from PTRBUS 40-16, the output of PDASM level 1 RAM 40-82 and the least significant ten bits of the current pointer from PTRBUS 40-16 and the VMBUS 40-14. In addition to receiving information from one of the sources selected by multiplexer 40-120, latch circuits 40-122 also receive a 5-bit E-cache command (C), generated by control logic section 40-30, in response to the required operation. The 5-bit command is applied to the E-cache as the 4-bit VECTL and 1-bit BIU command inputs of FIG. 1b.

Sections 40-14 Through 40-20

Section 40-14 includes the VMBUS which receives 32-bit input data from the E-cache data bus EC-BUS via input register 40-140 enabled by a signal E received from control logic section 40-30. This path is used in response to a read descriptor request made by VMU40 when missing descriptors are required to be fetched from main memory. The VMBUS also receives status signals from section 40-19. The VMBUS, as mentioned, provides data to the different VMU sections, such as sections 40-8, 40-10 and 40-12. Section 40-16 includes the PTR bus which receives the current virtual address 40-22 or pointer 1 from A-unit 20-4.

An exception vector generator section 40-18 includes a number of PAL devices which, in response to signals from control logic section 40-30, generate a 5-bit code VECT identifying the type of exception which occurred during normal processing. It identifies both VMU exceptions and trap codes passed to the VMU40 by A-unit 20-4. The VECT code is deemed valid when the VMU40 sets a VECT valid indicator signal V-INT to a binary ONE or active state.

A status section 40-19 stores indicator information in a status register 40-194 for signalling error checking violations which result in certain traps or page faults, in addition to VMU status information. The error checking indications include gate permit OK, gate bracket OK and gate SIZEOK signals, process and segment boundary violation signals, and write and read permission signals. The VMU status information signals include paged segment signal, security alarm signal, and READOK, WRITEOK, SIZEOK and read/write bounds OK signals. As shown, section 40-19 includes a group of PAL devices 40-190 which, in response to carry out signal CN12 and STATE signals from section 40-30, generate SIZEOK signal, in addition to the other status signals mentioned.

An error management section generates certain status and unusual event (UEV) signals for reporting purposes. Section 40-20 includes a plurality of PAL devices. As shown, these devices receive signals STATE, CMD, QDHIT, SEGHIT, PDHIT and parity error signals, in addition to a syndrome register reset signal. The PAL circuits of block 40-200 generate an output error signal ACDERROR which is forwarded to certain unusual event (UEV) logic circuits and a signal VMUERRORSTATUS which is stored in a syndrome register, not shown. The equations for these signals are given in the Appendix.

Control Logic Section 40-30

Section 40-30, in response to the 8-bit VMU command signals from the A-unit applied via command register 40-26 and status signals applied from the different VMU sections, generates the necessary subcommand signals required for carrying out the operation specified by the A-unit. The section 40-30 employs a state machine concept. As shown, section 40-30 includes a state control unit 40-32 which generates signals STATE0-5 specifying the current state and signals GOTO0-5 specifying a next state. The signals GOTO-0-5 are applied as inputs to a clocked PAL device 40-36 which generates output register enable signal E which is applied to registers 40-140, 40-68, 40-194 and 40-100. Both sets of signals are applied as inputs to the PAL devices which comprise a subcommand generator block 40-34. The block 40-34 provides as outputs, subcommand signal groups corresponding to outputs A through M. As shown, outputs A through M are either used directly or applied to PAL devices shown as distributed throughout the VMU sections. These PAL devices form part of subcommand generator block 40-34. These PAL devices, as well as the PAL devices included in block 40-34, are for the most part distributed throughout VMU40. For further information regarding section 40-30, reference may be made to the referenced related patent application titled, "A Virtual Memory State Machine."

Figure 2:
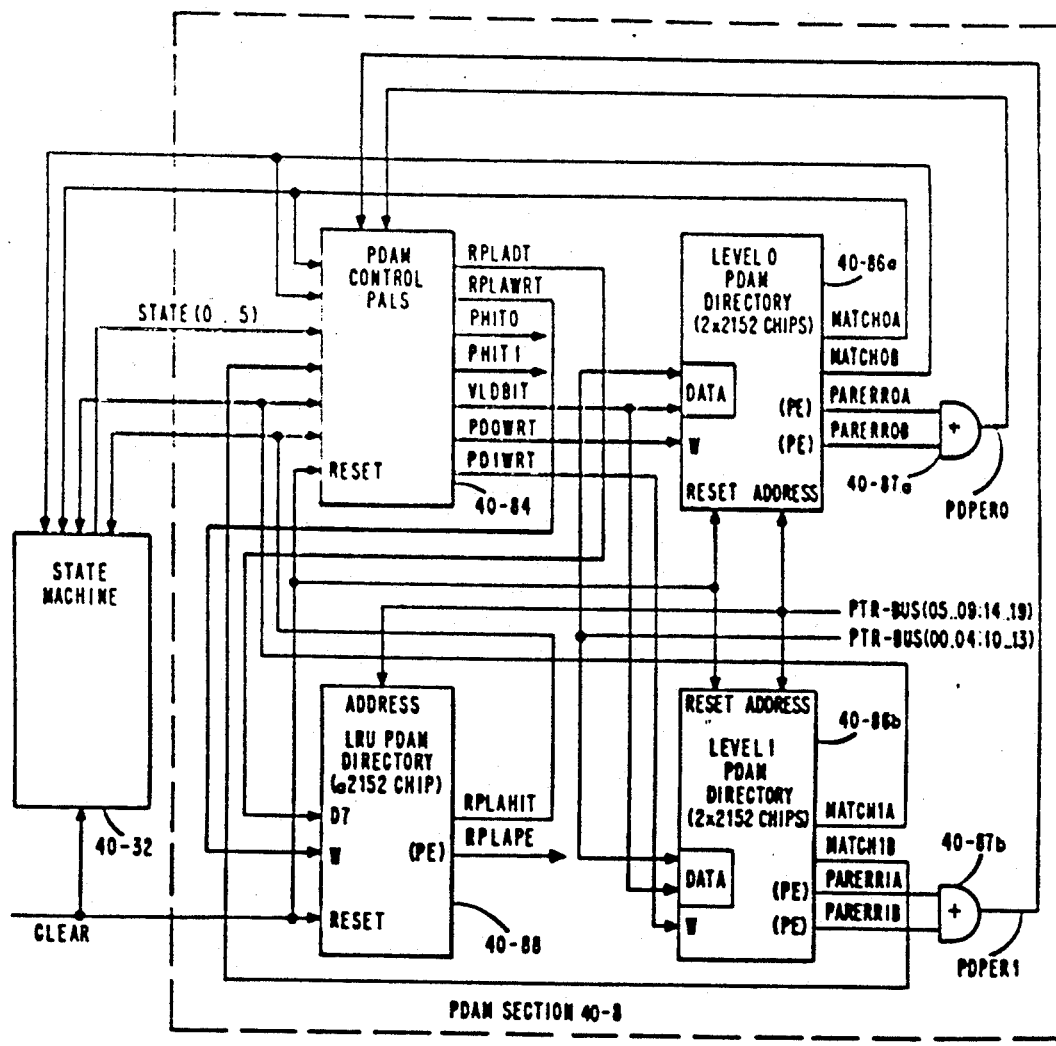
FIG. 2 is a block diagram of the page descriptor section of FIG. 1.

Replacement Level Generator LRU—FIG. 2

FIG. 2 shows in greater detail the PDAM section 40-8 of FIG. 1a constructed to include the retry mechanism of the present invention.

As seen from FIG. 2, the PDAM section 40-8 includes replacement level generator LRU 40-88, PDAM control circuits 40-89 and two directories 40-86a and 40-86b for associated RAM sections 40-80 and 40-82, arranged as shown. Each of the directories is constructed from two standard 2K×8 cache address comparator chip parts, such as SN74ACT2152, manufactured by Texas Instruments Inc. The part includes a high speed 2K×9 static RAM array, a parity generator, a parity checker, and a 9-bit high speed comparator circuit. A first group of pins are reset, read, write and select pins, respectively (i.e., $\overline{RESET}$, $\overline{R}$, $\overline{W}$ and $\overline{S}$), each activated by a low (0 V) voltage signal. A second group of pins are RAM address input pins, while a third group of pins are data input pins. One output pin is a match pin, while a further output pin is a parity error pin. Since each directory includes two such parts, there are two pairs of match and parity error output pins. The match pins provide the sets of match signals MATCH0A, 0B and MATCH1A, 1B, as shown. The parity error pins provide the sets of error signals PARERR0A, 0B and PARERR1A, 1B. The sets of parity error signals are ORed together by OR gates 40-87a and 40-87b to generate as outputs signals PDPER0 and PDPER1. The signals, along with the match signals, are applied as inputs to the control circuits 40-89.

The directories 40-86a and 40-86b store address information specifying where the page descriptors are stored in their respective RAMS 40-80 and 40-82. These circuits, in response to a request for page descriptor data, cause control circuits 40-89 to generate a page hit signal (PHIT0 or PHIT1) when the requested descriptor information is detected to reside in one of the RAM sections 40-80 or 40-82. As shown in FIG. 1, the hit signals contribute or form part of the mux selection signals F applied to multiplexer 40-120.

Replacement Level Generator 40-88

As shown in FIG. 2, LRU generator 40-88 also utilizes the cache address comparator part 74ACT2152. The LRU generator 40-88 provides other circuits within the PDAM section 40-8 with the level number of the cache RAM level which was least recently accessed by a member of the same set of addresses to which the input address applied to section 40-8 belongs. If the applied input address is the first occurrence of a member of its set (i.e., data was not written into the location), then level 0 is assumed to be the least recently used.

The LRU generator 40-88 records which one of the two levels was most recently accessed by any range or set of addresses. When addressed by a particular address set, LRU generator 40-88 generates the output signal RPLAHIT which is used to establish the least recently used level which should be updated for that address set when there is a miss indicating that the information specified by the address is not stored in either RAM section 40-80 or 40-82.

The signal RPLAHIT is applied as an input to the control logic circuits of block 40-89 where it is complemented and then stored for an upcoming write cycle. Circuits of block 40-89 also receive STATE signals, system clock signal $SVT3+00$ defining the third clock phase of a four-phase system cycle of operation, the MATCH signals MATCH0A, 0B, MATCH1A, 1B, parity error signals PDPER0 and PDPER1 from directories 40-86a and 40-86b, a signal XLATETRY derived from decoding the STATE and CMD inputs indicating that an attempt to translate a virtual address is in progress and a signal PDDBLH which registered detection of a double hit condition. The circuits of block 40-89 generate the required control signals, in addition to replacement address tag signal RPLADT, as explained herein.

Address signals PTR05-09, and 14-19 are applied to the corresponding input address pins designated as A0-A10. All address signals with the same value applied to inputs A0-A10 are members of the same set. All of the input data pins (D0-D6) are connected to ground, while pin D7 is connected to receive signal RPLADT from control circuits 40-89. The read ($\overline{R}$) pin is connected to receive a positive or +V voltage level which inhibits a read from taking place during normal operation. The select ($\overline{S}$) pin is connected to receive a low or zero volt level which enables the chip for operation. The write ($\overline{W}$) pin is connected to receive write signal RPLAWRT. The match pin generates output signal RPLAHIT, while the parity error ($\overline{PE}$) pin generates output signal RPLAPE. LRU generator 40-88 is reset by applying a low active signal to the $\overline{RESET}$ input of the LRU 2152 chip. As mentioned, this is done during system reset.

As explained herein, the LRU generator 40-88 is normally written only during cycles which produce "hits." This allows the LRU generator 40-88 to record the last level or most recently accessed level for a particular address-set. During the write cycle, the LRU-tag data, including the state of signal RPLADT, is written into the generator's internal RAM. The tag address applied to the data input pins of LRU 40-88 corresponds to ZEROS being applied to the first seven inputs and the state of signal RPLADT being applied to the eighth input. The state of signal RPLADT is written in accordance to the equation for this signal set forth in the Appendix.

LRU write cycles occur when the cache directory is not being written (i.e., the directory is being interrogated) when a "hit" occurs in either level of the cache memory. If the "hit" occurs in level 0 of the cache, then the LRU records into the addressed location, a high level or binary ONE RPLADT signal as input data. If the "hit" occurs in level 1 of the cache, then the IRU records into the addressed location, a low or binary ZERO level RPLADT signal as input data.

It will be noted that the occurrence of a parity error on level 1 causes LRU 40-88 to record the same higher level as if there was a hit on level 0. Also, the simultaneous occurrence of a hit on levels 0 and 1 are treated as if the hit occurred on level 1.

LRU generator 40-88 performs an interrogate cycle when neither the READ ($\overline{R}$) nor the WRITE ($\overline{W}$) input pin is active, and its Chip Select ($\overline{S}$) input pin is active. In this mode, the generator 40-88 uses the address on its address input pins to read out the contents of its internal RAM. The internal RAM contains a parity bit and any RPLADT values previously stored during previous write cycles. The value read out of its internal RAM is compared to the RPLADT value currently applied to its data input pins. If a match occurs, the LRU generator 40-88 forces the MATCH output pin to an active or binary ONE state.

Simultaneously, the parity of the stored data is checked, and any errors in the stored data are reported by error management unit 40-200 in a syndrome register, not shown, when the parity error output ($\overline{PE}$) pin is forced to an active state.

The LRU interrogate cycles occur only during cache "miss" cycles. That is, LRU generator 40-88 is written during cache "hits" and is interrogated during cache "misses".

Control Logic Circuits 40-89

The control circuits 40-89 generate the required control signals for processing requests. These signals are distributed to different parts of the PDAM section 40-8. As shown, these signals include an LRU tag signal RPLADT which is generated during an interrogation cycle, a replacement address write signal RPLAWRT for recording the last level accessed for the specified address set, cache page data level 0 and 1 write signals PD0WRT and PD1WRT for writing data into PD cache RAM sections 40-80 and 40-82, respectively, page descriptor level 0 and level 1 hit signals PHIT0 and PHIT1, and a valid bit signal VLDBIT for indicating when descriptors stored in RAM sections 40-80 and 40-82 are valid.

As shown, the circuits include a plurality of programmable array logic (PAL) circuit elements which include register storage. The PAL circuits of block 40-89 receive a clear signal, the state signals STATE0-5 from the state machine circuits 40-32, in addition to the match and parity error signals mentioned. Also, the circuits 40-89 receive the sets of input signals from PTRBUS 40-16. The PAL circuits are constructed from standard circuit parts and generate the indicated output signals, according to the Boolean expressions given in an appendix section included herein.

DESCRIPTION OF OPERATION

With reference to FIGS. 1a through 3b, the operation of the preferred embodiment will now be described. The circuits of PDAM section 40-8 upon power-up are cleared to their initial states in response to a clear signal. The state machine 40-32 tries to remain in the state A0 executing a virtual to physical translation every clock or cycle of operation on behalf of the system which includes the VMU 40 of FIGS. 1a through 1c. One of the normal types of exceptions to this occurs when the page descriptor associative memory PDAM section 40-8, which operates as a translation localized mechanism for speeding up the translation does not have the descriptor required stored in the more rapidly accessible memory (40-80, 40-82), thus forcing a page descriptor miss sequence of states to be executed beginning with state P0. The process performed by executing these states is to compute the address of the page descriptor needed for the translation, fetch it from main memory, verify that it is an appropriately numbered page within the segment and make certain when it is read that it is a valid page descriptor (valid bit set). If the valid bit is off or not set, the VMU40 signals the operating system with a page miss which fetches the requested page from backing store.

Figure 3A:
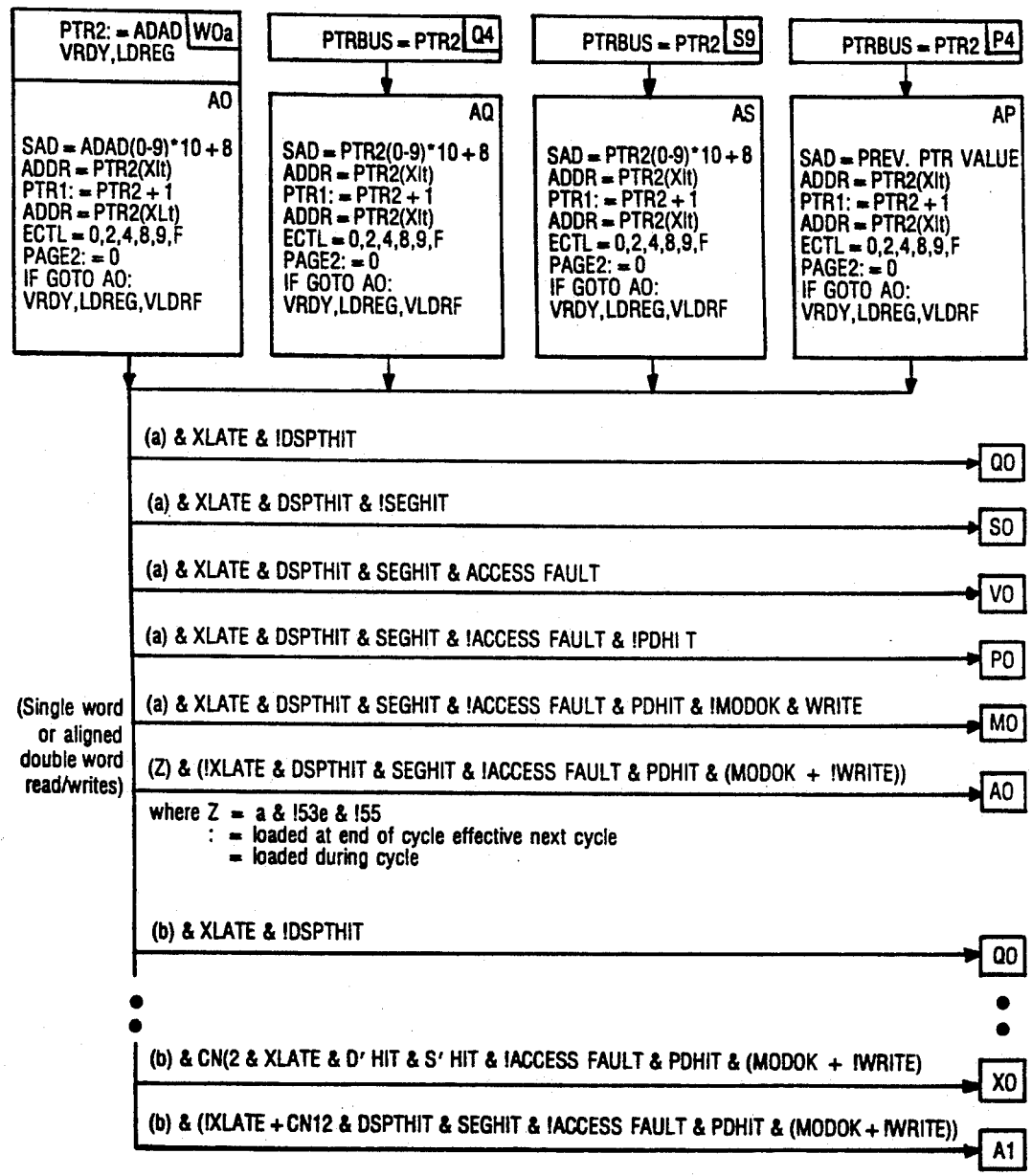
FIGS. 3a and 3b are flow diagrams used in describing the operation of the present invention.
Figure 3B:
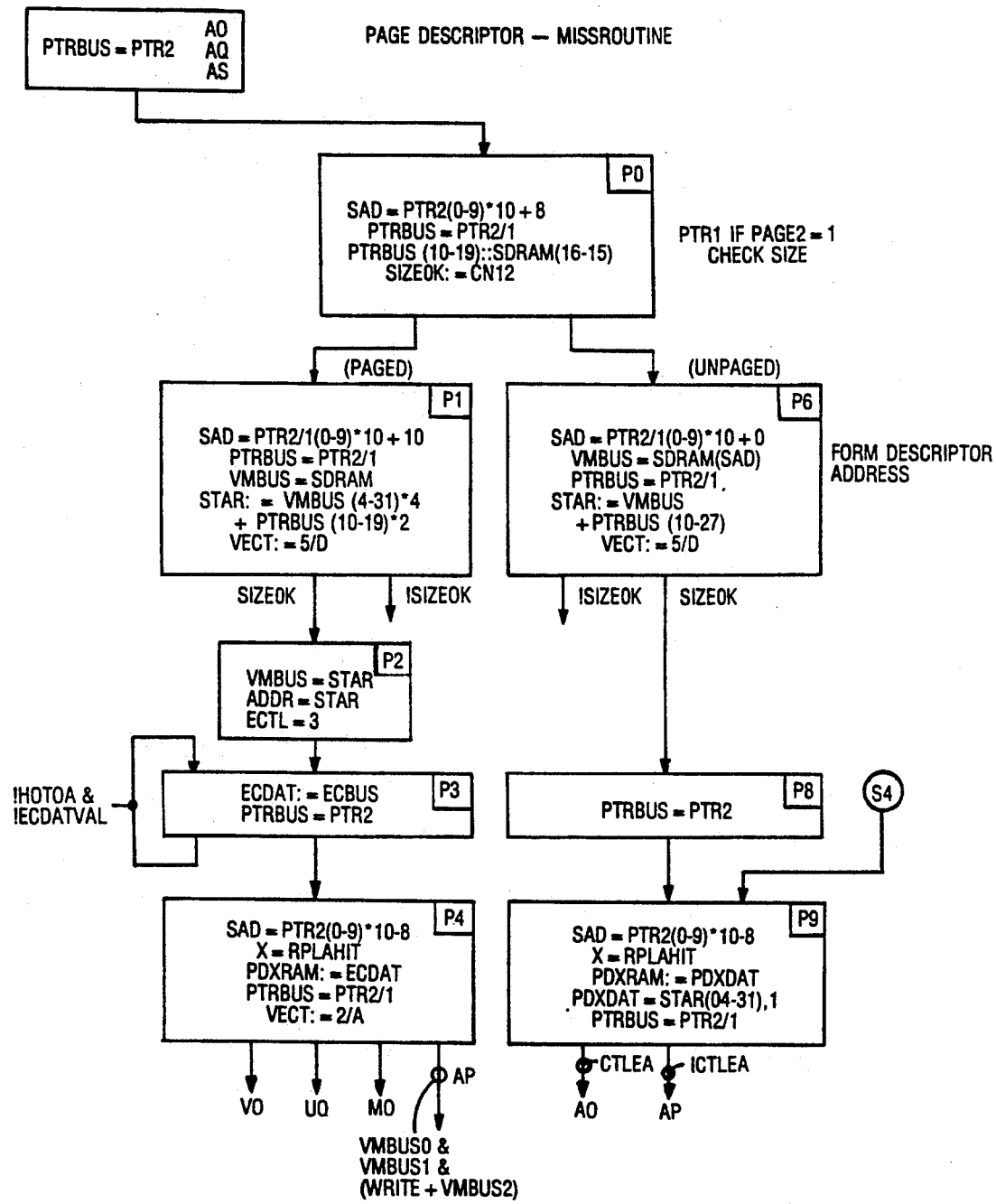

On the page descriptor miss flow of FIG. 3b, the VMU 40 normally sequences through states P0, P1, P2, some number of P3 states while waiting for a memory read, P4, to load the associative memory with the translation data corresponding to the page descriptor from memory, and returns to state AP which again attempts to translate the address.

As seen from FIG. 3a, state AP is very similar to state A0 and is used when VMU 40 failed to complete the translation the first time. The PDAM section 40-8 tries again to complete the translation. If it succeeds, the state machine 40-32 returns to state A0 for the next transaction. There are variations for the different cases, such as double word fetches, missing segment descriptors, etc.

In order to achieve the desired hit rate on the associator of the PDAM section 40-8, a two-level set associative cache type implementation was chosen similar to that disclosed in the previously mentioned related patent application of Forrest M. Phillips. For a given set of page and segment numbers, there are two places where a translation can be stored. Thus, up to two members of the set will be known to the hardware relative to what the translation is and if the reference is being made to either of the two translations, the VMU does not have to access main memory for the page descriptor.

When the VMU 40 references a third member of the set, a decision must be made relative to storing the third member. This is determined by the LRU 40-88 which indicates one of the two levels was most recently the target of a successful translation (provided a translated address). By remembering that level number, it is possible to direct the replacement of the other level (least recently used) when it becomes necessary to replace one of the two level numbers. This type of LRU operation utilizes a 2152 directory chip which is described in the referenced related patent application.

The present invention is directed to the operation of the PDAM section 40-86 two-level directories which contain parity detection circuits when such circuits report having detected a parity error. Several different modes of operation are possible. The above described the sequence of states when no parity error was detected on either level during the translation operation.

Another situation which is handled in the same fashion is when one level signals that it has the translation needed, while the other level signals that it has detected a problem or parity error. Since the level which reported the problem will be the next candidate for replacement, no special action is required. The only valid copy of the translation was found and is provided by VMU 40.

The case of one level simultaneously reporting both a hit and a parity error is not explicitly handled as all failure modes; to create such a combination would require two simultaneous transient failures or a solid failure of the parity check circuit. The preferred embodiment of the present invention uses criteria which only requires attempts to cure failures that could be caused by a single transient error.

Another case is when neither level reports a hit indicating that a page descriptor is missing and one level detects a parity error. Instead of replacing an arbitrary level depending on the LRU (the previous LRU information), the VMU40 substitutes its knowledge of which level had the parity error to make that level the one which is least recently used and the next candidate for replacement.

When both levels report a parity error, one of the levels is selected for immediate replacement similar to the last case. Since success in this repair now leaves them set in the state described in the first case, VMU 40 operates to replace the other level during a later translation attempt.

Finally, in the case of a double hit, this is treated as if both levels signalled a miss and, while one level is invalidated, the other is replaced with a fresh copy of the descriptor obtained from memory.

The above modes of operation are illustrated in the equations in the Appendix and the sequence of states indicated in flow charts of FIGS. 3a and 3b. One of the PALs of block 40-84 generates the write signals for the two-level directories (PD0WRT and PD1WRT), in addition to the write signals RPLAWRT and RPLADT for LRU chip 40-88. Signal RPLADT is the data signal applied as the replacement value to be written into the LRU. Signal RPLAWRT is the signal which conditions the LRU chip to perform the write instead of a compare operation. The signals PD0WRT and PD1WRT correspond to mutually exclusively generated write pulses which are applied as inputs to directories 40-86 and associated RAM chips 40-80 and 40-82 of PDAM section 40-8.

Another one of the PALs of block 40-84 generates valid bit signal VLDBIT which corresponds to the tenth bit which is appended to the address tag value written into level 0 or level 1 RAM data. This additional bit of data is used for indicating that the address being written into the directory is valid. That is, the operating system software may determine that the data stored in PDAM section 40-8 no longer matches the data stored in the main memory page tables (e.g. due to process swaps, interrupts or a page frame replacement algorithm reaches this conclusion). To improve system performance in this situation, all of the locations of the cache directory chips are cleared to ZEROS by their respective pins. This cleared state indicates to the VMU state machine that both levels for all sets do not match. Since a tag derived solely from the address may contain all ZEROS, an additional tag bit, valid bit, has been added. In practice, the valid bit is derived from the software controlled valid (V) bit of the page descriptor V bit (i.e., signal VMUBUS00) during PDWRT time of state P4. Although signal VLDBIT is written during state P9, and in the case of a double hit leading to state P0, the value written is known a priori. In the case of state P9, the signal VLDBIT is forced on during the creation of a pseudo page descriptor for unpaged segments, and it is cleared during state P0 to allow the invalidation of level 1 in the case of a double hit condition. This PAL forces the same valid bit to a known state during the LRU comparison phase where a translation is attempted to be located so it will match the recorded valid bit and not match a valid bit previously left cleared.

Referring to the equation for the signal RPLAWRT in the Appendix, it is seen that this signal is generated during the third time interval T3 of a four-phase clock signal. The signal XLATETRY denotes one of the states in which a virtual address to physical address translation is being attempted. The XLATETRY signal results from combining signals which indicate the state of the VMU 40 and the type of command being executed (i.e., whether or not a translation is to be performed in contrast to just passing on the virtual address as data, etc.). The three OR terms of the equation, PDHIT, PDPER0, and PDPER1 indicate that an entry will be written into the LRU directory chip when the VMU 40 is trying to translate an address and either a hit is detected on one of the two levels or one of the two levels reported a parity error.

The immediately preceding equation for signal RPLADT defines what is to be written into the LRU directory chip 40-88. It is seen that in the presence of state derived signal XLATETRY (e.g. A0), if a hit was detected in level 0 (PDHIT0=1) and no hit in level 1 (PDHIT1), signal RPLADT is a binary ONE. That is, a hit was detected in level 0 (most recently accessed), and therefore, a binary ONE should be written into the associated LRU location as the least recently used level. Therefore, during a replace cycle, when a ONE is later compared to the ONE written into that location, there will be a match or a ONE as an output indicating that level 1 is the one to be replaced. The signal PDPER1 indicates that when level 1 detects an error, signal RPLADT is again forced to a binary ONE causing level 1 to be replaced.

Summarizing the first two cases, if a normal hit was detected in level 0 and no parity error, a binary ONE is written into the LRU. If there is no hit detected on level 0 but a parity error was detected in level 1, a binary ONE is also written into the LRU which designates level 1 for replacement which occurs very soon.

The next line of the equation defines the state of signal RPLADT for use and modify cycles corresponding to states U0 and M0. During these operations, the use and modify bits of the page descriptor are updated. This involves the process of refetching the page descriptor and replacing the entry which detected the hit because the VMU 40 command in register 40-26 called for a memory write and the M bit of the level that detected the hit was off indicating that the corresponding M bit in the main memory copy of the page descriptor is off. This is a case where the VMU40 is not getting a new descriptor from main memory but is modifying an existing page descriptor and, therefore, wants to write into the same level that produced the hit. Therefore, the hit signal PDHIT1 is used to generate signal RPLADT, which is the opposite from the first case.

The last term defines states P4 and P9 which are the only states during which new data is being written into the PDAM section RAMs and directories. In this case, the data input to the LRU 40-88 should be a binary ONE so that when it is compared and the output is a ONE, the entry is written into the level 1 RAM. In the case of an "LRU miss", the entry is written into level 0.

The equations for signals PD0WRT and PD1WRT define the time when the directories 40-86 and RAMs are written. At time 3 (T3), during state P4 or P9, level 0 will be written if there is no replacement hit (!RPLAHIT) and level 1 will be written if there is a replacement hit (RPLAHIT). The remaining term for signal PD1WRT is the special double hit invalidate case. An invalid page descriptor is written into level 1 during state P0, which is not a normal write state, if a double hit was detected (i.e., PDDBLH) by another PAL circuit. Signal PDDBLH indicates that during XLATETRY, all four match output signals MATCH0A, 0B and MATCH1A, 1B were binary ONES.

The double hit detection case takes advantage of a special term in the equation for signal VLDBIT in the Appendix. Signal VLDBIT is true or active in states other than P4 and P0. In the case of a write during state P0, which occurs only when a double hit has been detected, signal VLDBIT is forced to a binary ZERO to invalidate the entry which is not being replaced. As seen from FIG. 3b, the sequence of states that pass through state P9 does not involve physical page descriptors from memory but are used for operations that build a pseudo page descriptor for unpaged segments so that the same mechanism can be used for translating only segmented virtual addresses into physical addresses.

The operations of the VMU 40 are audited by states and error reporting circuits of block 40-20. When VMU 40 performs a translate try operation, the occurrence of a double hit or page descriptor parity error is stored along with other types of errors.

When either a page descriptor parity error and no hit or double hit error is detected, this causes one of the PAL circuits of block 40-20 to generate a signal STRIKE2 noting the occurrence of the error during the first translation try operation. When VMU 40 gets to state AP, another XLATETRY state, and that yields another parity error without a hit or a double hit error, VMU 40 indicates that it is unable to continue (i.e., it is broken) by signalling an unusual event (UEV) condition. If the translation is successful, VMU 40 sequences back to state A0. At this time, the STRIKE2 signal is cleared. Thus, a UEV condition is signalled only when the execution of a single command or transaction results in two such errors.

It will be appreciated that there are other errors associated with other units which are similarly retried (e.g. quadrant, segment directories). If two transient errors occur within the same translation sequence, this results in the UEV condition being signalled. Another case is where the VMU40 translates a virtual address for a double word read command which crosses a page boundary. This requires two separate translations because the two physical addresses may not be contiguous, although they are logically adjacent. The VMU40 sequences through a first sequence of states that performs the translation try on the first address. The VMU40, upon successfully completing the first translation, performs the translation try on the incremented virtual address. If two parity errors occur during this operation, this is also reported as a UEV error condition.

If the LRU 40-88 generates a parity error, it is not considered a fatal error, since it only indicates that the LRU mechanism could be operating as a single level set associative memory. There is no retry, but the error is reported for error logging purposes.

From the above, it is seen how the apparatus of the present invention, upon detecting certain types of error conditions, treats each such type of error as a complete miss in the descriptor RAM (e.g. page, segment, quadrant), fetches a fresh copy of the descriptor from main memory and retries the operation with the fresh copy. The conversion of the specific error into a miss automatically initiates the retry state sequence. If the retry still results in an error, or if two errors are detected during the execution of the same command, the VMU signals that it is unable to continue.

The invention maximizes the effective use of states for detecting such errors, correcting or altering the state of the LRU mechanism for avoiding any repetition of certain errors and for retrying certain types of errors. This reduces considerably the complexity of the VMU design, in addition to facilitating the detection of errors. Additionally, it maximizes the use of common sequences of states. For a summary of the various states, the Appendix may be consulted. Additionally, the referenced patent applications may also be consulted.

| APPENDIX | | |
|---|---|---|
| I. | SUMMARY OF STATES | |
| | A0 | = initial state for all VMU operations. |
| | A0, AP, AQ, AS | = translate (first) virtual address to physical address, check validities, permissions, rings, etc., prepare to check next virtual address (i.e., VAPLUS1). |
| | A1 | = process the second word of unaligned double words for commands which can be executed |

-continued

APPENDIX

| | | |
|---|---|---|
| L0, K0 through K7 | = | within two cycles (class b). access local VMU resources (DSBR, DSPTN, descriptor directory, status, etc.). |
| M0 through M3 | = | mark page descriptor as modified. |
| P0 through P4 | = | retrieve missing page descriptor. |
| P6, P8, P9 | = | create pseudo page descriptor for unpaged segment |
| Q0 through Q4 | = | retrieve missing quadrant descriptor (D SPT). |
| S0 through S9 | = | retrieve missing segment descriptor |
| U0 | = | mark page descriptor as used. |
| V0, VM, V1, V2 | = | signal V-INT to CPU. |
| X0 through X2 | = | security check for second word of a page crossing double word. |

II. LOGIC EQUATIONS

The symbols define the following:
  $ denotes state code
  # = or
  & = and
  T3 is a clock time
  ! = inversion
  .D = registered (clocked) value.

1. PHIT0    = PDHIT0 & !PDHIT1 where
              PDHIT0 = MATCH0A & MATCH0B;
              PDHIT1 = MATCH1A & MATCH1B;
              PDHIT = PDHIT0 # PDHIT1 ;
2. PHIT1    = PDHIT1 & !PDHIT0;
3. RPLADT   = PDHIT0 & !PDHIT1 & (XLATETRY)
            # PDPER1 & (XLATETRY)
            # PDHIT1 & ($U0 # $M0)
            # ($P4 # $P9)
4. RPLAWRT  = T3 (XLATETRY & (PDHIT # PDPER0 # PDPER1)
            # T3 & ($U0 # $M0)
5. PD0WRT   = T3 & ($P4 # $P9) & !RPLAHIT;
6. PD1WRT   = T3 & ($P4 # $P9) & RPLAHIT
            # T3 & $P0 & PDDBLH
7. VLDBIT   = !($P4) & !($P0)
            # VMBUS00 & !($P0)
8. PDHIT    = MATCH0A & MATCH0B
            # MATCH1A & MATCH1B
9. PDDBLH.D = MATCH0A & MATCH0B & MATCH1A & MATCH1B & XLATETRY
            # PDDBLH & !XLATETRY
10. STRIKE2.D = STRIKE & XLATETRY
             # STRIKE2 & !STATEA0 & !RSTSYND
             where STRIKE = DSPTHIT & (SDPE # SEGHIT & PDERROR)
11. VMUERROR.D = !RSTSYND & (STATEBAD
                # FULLERR
                #!STATEA0 & XLATETRY & STRIKE & STRIKE2
                #XLATENOW & (STRIKE
                                #!DSPTHIT
                                #!SEGHIT
                                #!PDHIT)
                #VMUERROR)
12. ACCERR.D = !RSTSYND & (STATEBAD
               #!STATEA0 & XLATETRY & STRIKE & STRIKE 2
               #XLATENOW & (STRIKE
                               #!DSPTHIT
                               #!SEGHIT
                               #!PDHIT)
               #VMUERROR)
               #ACDERR)

where XLATENOW is active or a binary ONE in those states in which the virtual to physical translation can proceed without further information (e.g. state A1).

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A virtual memory unit (VMU) including:
  a set associative memory having a plurality of parallel addressed levels for storing information pertaining to a number of predetermined sets of address translations, each level having a buffer store having a plurality of locations for storing descriptor information for performing address translations and a directory circuit having address and data inputs for receiving address and tag portions respectively of a common input virtual address, said directory circuit including a random access memory (RAM) containing a plurality of storage locations for storing address tags for designating which predetermined set of address translations is actually stored in corresponding locations of said buffer store of said each level containing said descriptor information, a comparator for generating match output signals for indicating detection of a true comparison indicative of a match between the address tag contents of said directory RAM storage locations specified by said address portion of said input virtual address and said tag portion of said virtual address and error detection circuits for detecting an error in said address tag contents of one of said directory locations producing said match output signals;

a least recently used (LRU) device having a number of addressable storage locations for storing level information for said plurality of levels used for generating signals for indicating a next level in said buffer store of one of said plurality of levels in said next level into which descriptor information is to be written;

state machine apparatus for generating a plurality of states for sequencing said VMU through a series of operations for translating said input virtual address into a physical address; and control means coupled to said state machine apparatus, to said LRU device and to said set associative memory, said control means generating control signals for accessing and updating said descriptor information contents of said set associative memory and said level information contents of said LRU device in addition to generating hit output signals for signalling detection of a hit condition, said control means including retry means coupled to said error detection circuits, said retry means causing said state machine apparatus to alter said plurality of states and said control signals applied to said LRU device as a function of whether said match was detected by said comparator of said directory circuit of one of said plurality of levels and which one of said plurality of levels detected said match, said plurality of states and said control signals being altered for recovering from said error which is transient in nature.

2. The apparatus of claim 1 wherein said control means includes logic means which in response to said error signal detected by said error detection circuits of said directory circuit of one of said plurality of levels on one of said plurality levels and said match on another one of said levels generates signals for inhibiting said retry means from initiating a retry operation and for causing said LRU device to carry out level replacement in a normal manner.

3. The apparatus of claim 1 wherein said control means includes logic means which in response to said match output signals indicating that no match was detected on any of said plurality of levels and that said detection circuits of said directory circuit of one of said plurality of levels detected an error on one of said levels, generates signals for causing said LRU device to store information in one of said number of addressable storage locations for indicating that said one level is the least recently used level making said one level a next candidate for replacement.

4. The apparatus of claim 1 wherein said programmable control means includes logic means which in response to signals from said error detection circuits of said directory circuit of said plurality of levels that a plurality of said levels detected errors, generates signals for causing signaling of an absence of said hit condition on said plurality of said levels and invalidating one of said plurality of levels thereby causing said other levels to have corresponding locations within their buffer stores replaced with fresh copies of descriptor information fetched from memory.

5. The apparatus of claim 1 wherein said VMU further includes error management means coupled to said control means and to said error detection circuits of said directory circuit of each of said plurality of levels, said error management means including programmable control means coupled to said state machine apparatus and to said error detector circuits, said programmable control means monitoring occurrences of said error and upon detecting occurrences of more than one error during the same translation sequence defined by said state machine apparatus sequencing through a predetermined sequence of states, generating an unusual event signal for indicating detection of a transient fault within said VMU.

6. A method for ensuring robust operation of a virtual memory unit (VMU) having a multilevel set associative memory having first and second inputs for receiving address and tag portions of input virtual addresses, said memory having a plurality of buffer stores corresponding in number to a number of ways of performing address translations for storing descriptor information for performing said address translations and a corresponding number of directories, each directory having a plurality of storage locations for storing tags designating which address translations are actually stored in corresponding locations within a corresponding one of said buffer stores, a corresponding number of comparator circuits, each comparator circuit for generating match output signals for signalling true comparisons indicative of matches between the tags contained in said plurality of storage locations of an associated directory specified by said address portions of said virtual addresses and a corresponding number of error detection circuits, each error detection circuit for detecting errors in said tags contained in said plurality of storage locations of said associated directory which produced said match output signals, said VMU further including a least recently used (LRU) device having a plurality of addressable storage locations for storing level information used for generating LRU signals for indicating those levels into which new descriptor information is to be written during level replacement operations, said method comprising the steps of:

(a) generating signals corresponding to a plurality of states by a state machine element used for sequencing said VMU through a series of operations for translating said input virtual addresses into physical addresses;

(b) generating control signals by control circuits coupled to said state machine element, said associative memory and to said LRU device for updating the descriptor information of said associative memory and said level information of said LRU device in addition to generating hit output signals for signalling detection of a hit condition; and, (c) retrying operations during said translating by altering generation of said signals in step (a) when errors are detected by one of said number of error detection circuits so as to enable recovery from transient faults.

7. The method of claim 6 wherein said method further includes the step of:

(d) generating signals by said control means in response to said error signal being detected on one of said multilevels and when a true comparison corresponding to a match is detected by one of said error detection circuits on another one of said multilevels for inhibiting said retry means from initiating a retry and for causing said LRU device to carry out level replacement in a normal manner.

8. The method of claim 6 wherein said method further includes the step of generating signals by said control means in response to said match signals indicating that no true comparison representative of no match was detected on any of said levels and that one of said detection circuits detected an error on one of said levels, for causing said LRU device to store information in one of said plurality of storage locations for indicating that said one level is the least recently used level making said one level a next candidate for replacement.

9. The method of claim 6 wherein said method further includes the step of generating signals by said control means in response to signals from a plurality of said error detection circuits that a plurality of said levels detected errors, for causing signalling of an absence of said hit condition on said plurality of said levels and for invalidating one of said levels thereby causing other levels to have corresponding locations within their buffer stores replaced with fresh copies of descriptor information fetched from memory.

10. The method of claim 6 wherein said method further includes the step of:

monitoring the occurrences of errors detected by said number of error detection circuits; and, signalling the detection of an unusual event for indicating the occurrence of a transient fault when more than one error is detected to occur during execution of the same translation operation by said VMU.

* * * * *